United States Patent [19]

Bain et al.

[11] Patent Number: 4,524,364

[45] Date of Patent: Jun. 18, 1985

[54] CIRCUITRY FOR CORRECTING DOT PLACEMENT FOR OSCILLATING CARRIAGE INK JET PRINTER

[75] Inventors: Lee L. Bain, Arlington; Kenneth H. Fischbeck, Dallas, both of Tex.

[73] Assignee: Xerox Corporation, Stamford, Conn.

[21] Appl. No.: 443,762

[22] Filed: Nov. 22, 1982

[51] Int. Cl.[3] ...................... G01D 15/16; G01D 15/18

[52] U.S. Cl. ...................................... 346/1.1; 346/75; 346/140 R

[58] Field of Search ....................... 346/140 R, 75, 1.1

[56] References Cited

U.S. PATENT DOCUMENTS 4,345,263 8/1982 Tazaki et al. ............... 346/140 R X 4,386,358 5/1983 Fischbeck ........................ 346/1.1 X

*Primary Examiner*—E. A. Goldberg

*Assistant Examiner*—Gerald E. Preston

*Attorney, Agent, or Firm*—Robert E. Cunha

[57] ABSTRACT

A circuit for use in an ink jet printer in which the carriage motion either approximates a sinusoidal vibratory pattern, or which has any variable velocity pattern that reliably repeats from cycle to cycle. It is further assumed that the printer will print in both directions of the carriage, and that the flight time of the ink drop from jet to paper is constant. A counter starts at a value corresponding to the flight time of the ink drop, and then measures the time of the carriage over a predetermined distance. The difference is the required delay. A second delay counter uses this value to produce a time delay prior to ejecting the ink drop. Since, in an actual ink jet printer, several drops will be in transit at the same time, the circuit is provided with a plurality of phases or channels which operate concurrently.

11 Claims, 12 Drawing Figures

CIRCUITRY FOR CORRECTING DOT PLACEMENT FOR OSCILLATING CARRIAGE INK JET PRINTER

This invention is a drop-on-demand ink jet printer timing circuit and, more specifically, is an electronic method for correcting ink dot placement by automatically generating the appropriate lead time for asynchronous firing of ink drops from an ink jet printhead that is mounted on a carriage that oscillates in harmonic motion with a velocity-position profile that is inherently sinusoidal.

The drop-on-demand ink jet printing process causes individual ink drops to be ejected asynchronously, as needed, to effect dot-matrix imaging made up of a raster of scanlines. In a typical ink jet printer configuration, ink drops are ejected on-the-fly; i.e., with the fast-scan element (e.g., the printhead) in motion relative to the record medium (e.g., the paper), and with drop-fire timing derived from a position-sensing transducer (encoder) that is physically coupled to the fast-scan element so as to identify each addressable X-axis pixel (dot) position along a scanline. Typically, the Y-axis (scanline) positioning is by incremental motion of the slow-scan element (e.g., the paper) during the turnaround time of the translating fast-scan element.

Since an ink drop ejected on-the-fly has lateral velocity as well as forward velocity, its trajectory is a vector addition of its forward velocity ($V_z$) and its (the printhead's) lateral velocity ($V_x$). Therefore, a drop ejected at the instant of crossing a given X-axis pixel address (encoder point) impacts the paper at a point lagging its target address by the distance ($D_x$) that the drop travels laterally during the time ($T_z$) that the drop is in forward flight from nozzle to paper. If $T_z$ and $V_x$ are both assumed constant, then, $D_x$ is constant and dot spacing along a scanline is constant, although the entire scanline will be shifted in the direction of scan by the constant distance $D_x$. If all scanlines are printed in the same direction, then the entire raster (page) is simply offset by $D_x$ without distortion of the image. However, if printing is bidirectional, then the relative offset between scanlines of opposite direction is $2D_x$ and print quality is degraded by the jaggedness of vertical edges in the printed image. The maintenance of bidirectional print quality requires each ink drop in a scanline to be placed on its absolute X-axis pixel address, regardless of scan direction, such that the resulting matrix of dots form straight lines in both the X and Y axis. Clearly, to place a drop precisely on its target address requires its ejection to lead the target address by the distance $D_x = V_x \times T_z$, where $V_x$ is the instantaneous velocity of the carriage at the point of drop ejection. Typically, ink jet printer carriage transports are designed for constant velocity or, at least, printing is limited to the portion of carriage travel that is near constant velocity. For such a case, the jet-fire timing may be simplified by adjusting the carriage velocity and/or the drop's time-of-flight such that the drop's time-of-flight is exactly equal to the time required for the carriage to traverse an integer number of pixel positions; i.e., where $V_x \times T_z = D_x = n$ pixels. Then, each scanline may simply be started n pixels early. For the above case, which fits the case for the conventional reciprocating-carriage ink jet printer, even though X-axis pixel addresses are generated by a precision carriage-position encoder, the X-axis dot placement accuracy still relies heavily upon the rigid control of a constant carriage velocity.

This invention relates to a somewhat unconventional ink jet printer configuration based on an oscillating-carriage concept as disclosed by previously filed patents entitled: "Suspension for an Oscillating Bar", U.S. Pat. No. 4,322,063 filed Apr. 14, 1980 and "Multifunction Graphic Engine Based on an Oscillating Scanner", U.S. Pat. No. 4,314,282, filed Apr. 14, 1980. Those patents claim the oscillating-bar to be an improved ink jet carriage configuration due to its simplicity of suspension (spring flexures eliminate rolling or sliding friction), quiet operation, low cost (few parts, simple to manufacture), and low drive-power requirement (oscillation at natural resonant frequency).

In contrast to the more conventional constant-velocity ink jet kinematics, discussed above, the harmonic motion of the oscillating-carriage presents a more complicated set of kinematics. In this case, the carriage velocity ($V_x$) is not constant and, in fact, has a sinusoidal profile with a $V_x$(max) at the center of travel and $V_x=0$ at each end of travel. The resulting drop trajectory vector varies accordingly, that is, with the same sinusoidal profile. Without compensation, the dot spacing along a scanline varies sinusoidally as does $V_x$ (i.e., $\Delta D_x = \Delta V_x \times T_z$). Clearly, the simple compensation algorithm, discussed above for constant-velocity carriage motion, where each scanline is simply started early by a constant distance, is not sufficient for this case. Although the required lead distance ($D_x$) varies according to position in the carriage velocity profile, the required lead time ($T_{lead}$) for each drop is constant, being, of course, the same as the drop's forward time-of-flight ($T_z$). In practice, the desired $T_{lead}$ may be effected by generating a jet-fire pulse after a calculated time-delay ($T_{lag}$) following a given earlier event; e.g., an encoder pulse corresponding to a carriage position that leads the target pixel point by a fixed distance of n pixels. This n-pixel "drop-zone" preceding each pixel address must be at least the distance $D_x = T_z \times V_x$(max). For a given carriage velocity profile, a precise $T_{lag}$ may be computed for the drop-zone for each pixel-point of the x-scan. This "map" of computed $T_{lag}$ values may easily be stored in digital form in a memory "look-up-table" to be accessed during scanning to load digital delay counters for generating the jet-fire timing. The precision of this scheme requires the carriage velocity profile to be rigidly maintained to match the stored "map" of pre-computed values for that given profile.

The realization of the previously stated advantages of the oscillating-carriage printer concept assumes the carriage to oscillate at its natural resonant frequency using an economical low-power driving method; e.g., an electromagnetic transducer ("voice-coil"), without rigid control of the carriage velocity or displacement. The primary stability of the oscillation depends on the relatively high Q of the mechanical resonance of the carriage/suspension spring/mass system. The primary control of scanline dot placement is derived from a linear encoder that continuously senses the position of the oscillating ink jet carriage. This invention provides a simple and cost-effective electronic method and circuitry that provides compensated jet-fire timing that automatically tracks gradual changes in the carriage velocity-position profile, thereby obviating expensive rigid controls, and enabling the application of an economical "loosely-controlled" carriage drive system. The circuitry uses simple up/down digital counting logic and a small RAM (Random-Access-Memory). As the carriage oscillates, pulses are generated by a position-sensing encoder, and a counting circuit measures the period (elapsed-time) for each drop-zone as it is crossed during a complete scan cycle. From the measured period, a $T_{lag}$ value is calculated and stored in the RAM table at an address corresponding to the respective drop-zone. On the subsequent scan cycle, as the carriage reaches the beginning of each drop-zone, its respective $T_{lag}$ value is accessed to generate the jet-fire timing pulse for that zone. The cycle repeats continuously with the $T_{lag}$ table being updated on each cycle. Clearly, the accuracy of this method assumes a negligible cycle-to-cycle variation in the carriage velocity-position profile, however, experience has shown this to be true, due to the excellent cycle-to-cycle stability of the high-Q carriage suspension system oscillating at its natural resonant frequency.

DETAILED DESCRIPTION OF THE DRAWINGS

Figure 1:
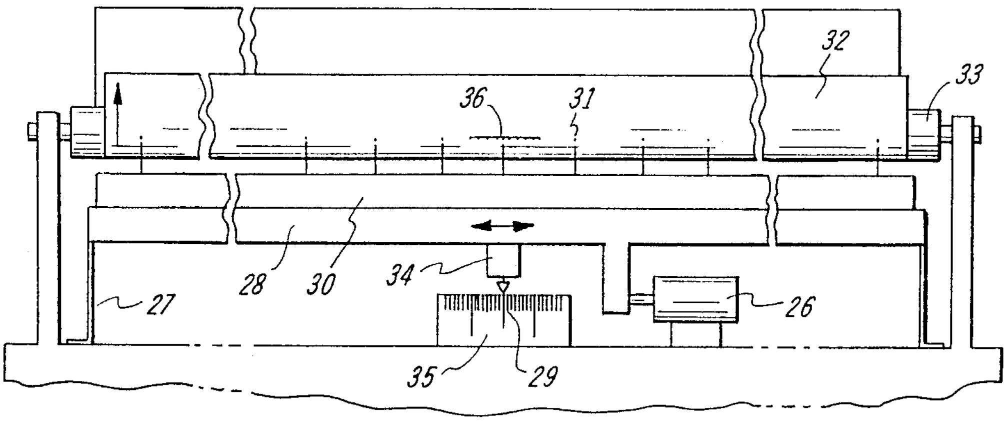
FIG. 1 is a simplified sketch of the relationship betwen various components of an exemplary oscillating-carriage ink jet printing apparatus.

FIG. 1 is a simplified drawing of an exemplary oscillating-carriage ink jet printing apparatus comprising a linear array of ink jet nozzles forming a page-width ink jet printhead 30 mounted on a support member (carriage) 28 which is, in turn, supported by spring flexure members 27, each nozzle of the printhead delivering ink drops 31 to form dots on a record medium (sheet of paper) 32 which is controlled by a support member 33. The motion of the printhead is a simple lateral sinusoidal oscillation sustained by energy from an electromagnetic transducer 26. As the printhead moves through each half-cycle of oscillation, each nozzle scans its respective segment 36 of a page-width scanline while a sensor 34 detects each pixel (dot) address point 29 on a linear encoder scale 35. The paper position is advanced, incrementally, one scanline for each half-cycle scan of the carriage, by a stepping-motor not shown.

Figure 2:
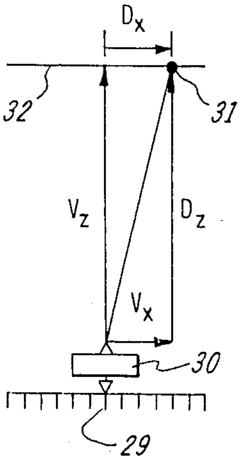
FIG. 2 is a vector diagram of the lateral and forward velocities of an ink drop ejected on-the-fly.

FIG. 2 shows that an ink drop 31, ejected on-the-fly at point 29, impacts the paper 32 at a point lagging that point by the distance $D_x$ that the drop travels laterally, due to its lateral velocity $V_x$, during its time-of-flight $T_z$ at a forward velocity of $V_z$ over the distance $D_z$ between the nozzle of printhead 30 and the paper 32; i.e., $D_x=V_xT_z$, where $T_z=D_z/V_z$.

Figure 3:
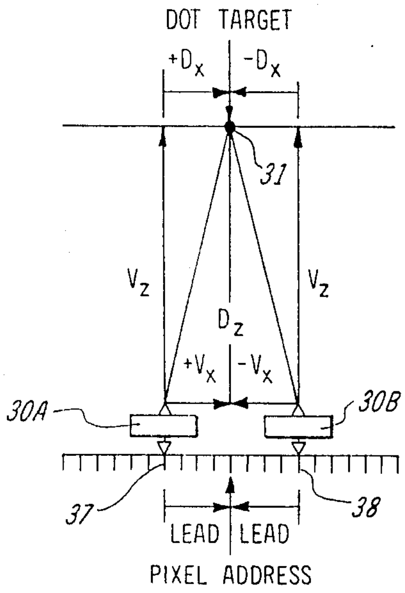
FIG. 3 is a vector diagram of ink drop trajectories for bidirectional printing.

In this invention, ink drops are ejected while the carriage is moving in either direction as shown in FIG. 3. When a left-to-right scanline is being printed, a drop must be ejected when printhead 30*a* is at point 37 to place the drop at a given x-axis a dot address at 31. For the next scanline, with the printhead 30*b* moving in the opposite direction, if a drop is to be placed at the same x-axis dot address at 31, the drop must be ejected at point 38. FIG. 3 shows this required lead to be equal to $D_x$. In this example, the lead $D_x$ shown equal to exactly four encoder points could be correct for a given encoder resolution and a given $V_z$, $D_z$, and $V_x$. Such a constant lead of n encoder points could be used if $V_z$, $D_z$, and $V_x$ remain constant, however, the carriage motion of the described embodiment is not constant velocity and, therefore, requires lead distance to be non-constant. The circuit of this invention automatically calculates lead timing, based on carriage velocity, for each X-axis pixel address of each scanline.

Figure 4A:
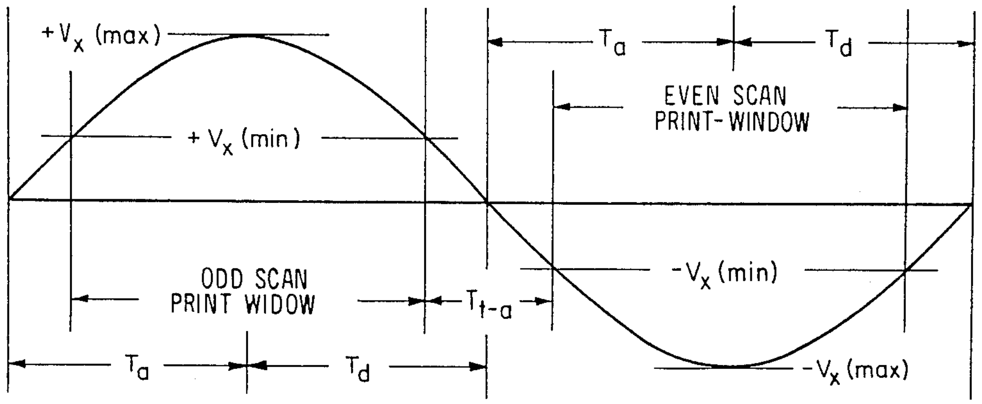
FIG. 4 (4*a* and 4*b:* carriage velocity profiles), is a diagram comparing the carriage velocity-position profile of the oscillating-carriage printer to that of a constant-velocity carriage printer.
Figure 4B:
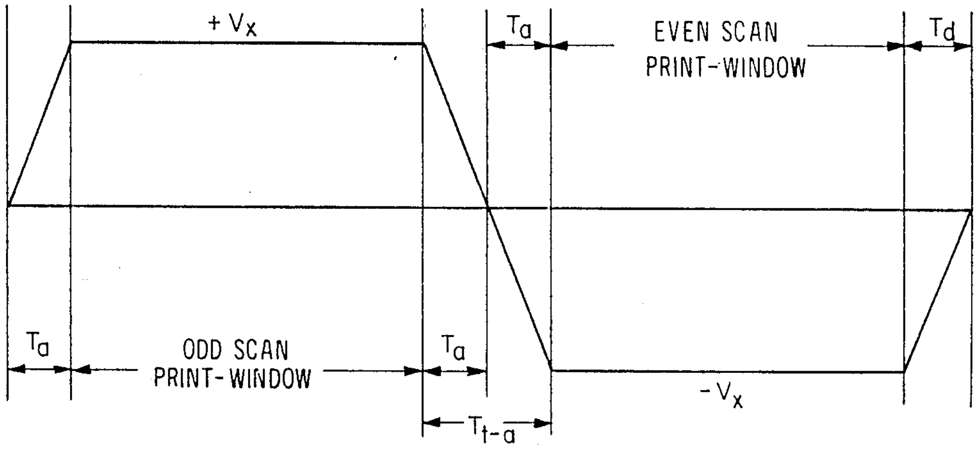
Figure 5:
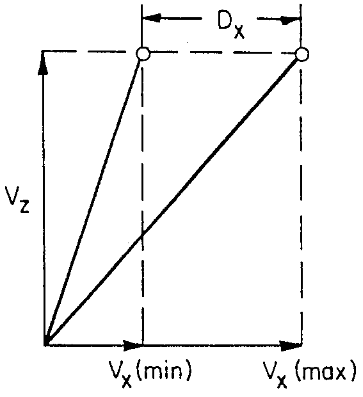
FIG. 5 is a vector diagram showing the lateral variation in drop impact point as a function of carriage velocity.

FIG. 4*a* shows the carriage motion velocity-position profile of the described embodiment to be sinusoidal. FIG. 4*b* shows, in contrast, a constant-velocity profile. The sinusoidal motion is most economical to produce, but requires a constantly recalculated lead time. As shown in FIG. 4*a*, velocity varies from $V_x$(min) to $V_x$(max) through the length of the print window, resulting in a corresponding variation in lateral drop velocity and dot placement as shown in FIG. 5; i.e., $\Delta D_x=\Delta V_xT_z$.

Figure 6:
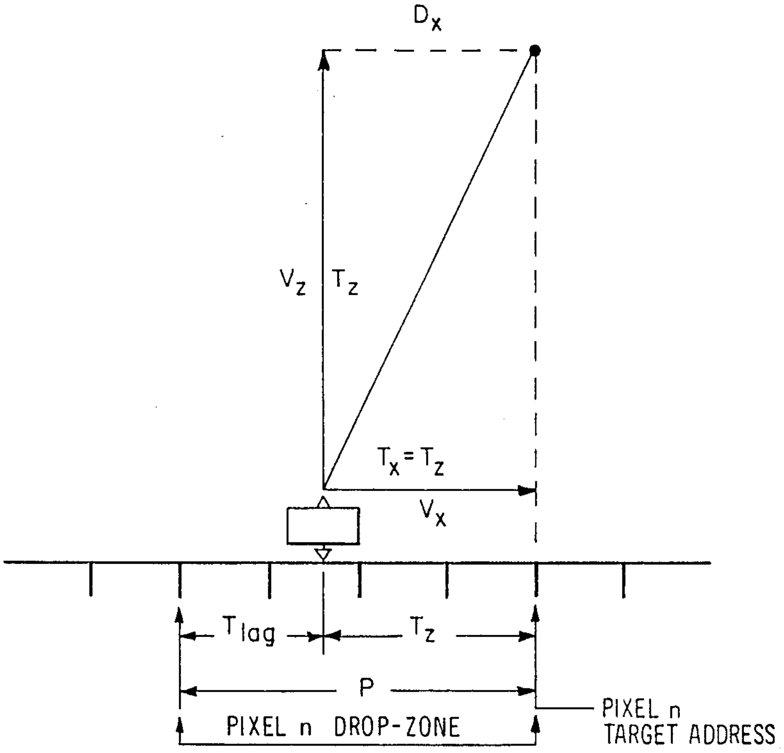
FIG. 6 illustrates the equation $T_{lag}=P-T_z$.
Figure 7:
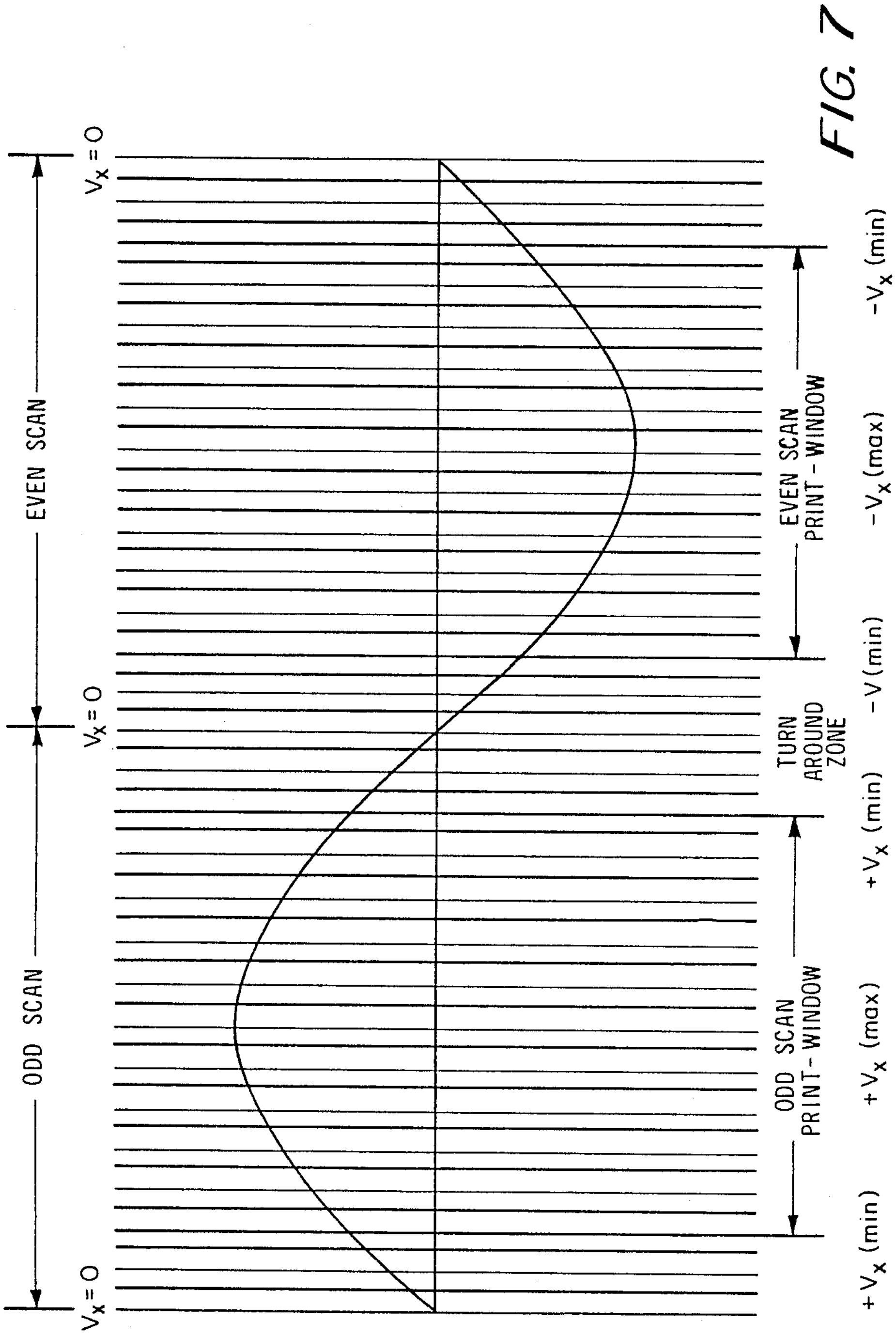
FIG. 7 is a diagram showing the oscillating-carriage velocity-position profile divided into zones that are viewed as constant-velocity zones.

FIGS. 6 and 7 show the process used by the circuit for calculating lead. FIG. 7 shows a complete cycle of carriage oscillation with carriage travel equally divided into drop zones derived from the carriage-position encoder. FIG. 6 shows that each encoder point (pixel address) is preceded by such a zone within which a drop must be ejected for that pixel address. Each drop zone is a constant number of encoder points wide equal to a distance that is at least as great as the longest lead required at $V_x$(max); i.e., $D_{zone}\geqq V_x(max)T_z$. The example in FIG. 6 shows a zone four pixels wide which would be sufficient for a maximum carriage velocity of 26.7 inches per second for a typical configuration where the drop time-of-flight $T_z$ is 500 microseconds and the encoder resolution is 300 lines per inch. For this exemplary embodiment, we assume $V_x$(max)=20 in/sec and $V_x$(min)=10 in/sec, where $V_x$(min) is the printwindow limits. The overscan time (turnaround zone) is used for advancing the paper to the next scanline position.

The circuit calculates the lead in terms of a time delay ($T_{lag}$) from the beginning of each drop-zone. A counting circuit generates the $T_{lag}$ value by subtracting the required lead time $T_x$ (assumed to be equal to the drop's time-of-flight $T_z$) from the measured period P of the drop-zone. As shown in FIG. 7, the calculation is based on the average carriage velocity during the drop-zone. Since there is little difference between average and instantaneous velocity near the center of the printwindow, and since the printwindow excludes the end travel where the difference is the greatest, the simple calculation $T_{lag}=P-T_z$ effects dot placement correction with acceptable accuracy.

As the carriage moves through each cycle of oscillation, the period of each drop-zone is measured by counting circuitry. From each measured period value, a constant time-of-flight ($T_z$) value is subtracted to yield a $T_{lag}$ value for each drop-zone. In order that each $T_{lag}$ value may be used to generate a jet-fire pulse for the drop-zone for which it was calculated, the $T_{lag}$ values calculated during a given carriage cycle are recorded in a small memory table to be accessed during the subsequent carriage cycle to load counting circuitry that generates the delayed jet-fire pulses. Because of the excellent stability of the high-Q carriage system oscillating at natural resonance, the cycle-to-cycle variation in the carriage velocity-position profile is assumed to be negligible. Experience has confirmed this.

Since the counting circuitry described operates over a zone that is n-encoder pulses wide, in this example n=4, a jet-fire pulse is generated for each nth pixel position, therefore, n such counting circuits are required to operate concurrently but phased such that their merged outputs generate a jet-fire pulse for each encoder pulse.

Figure 8A:
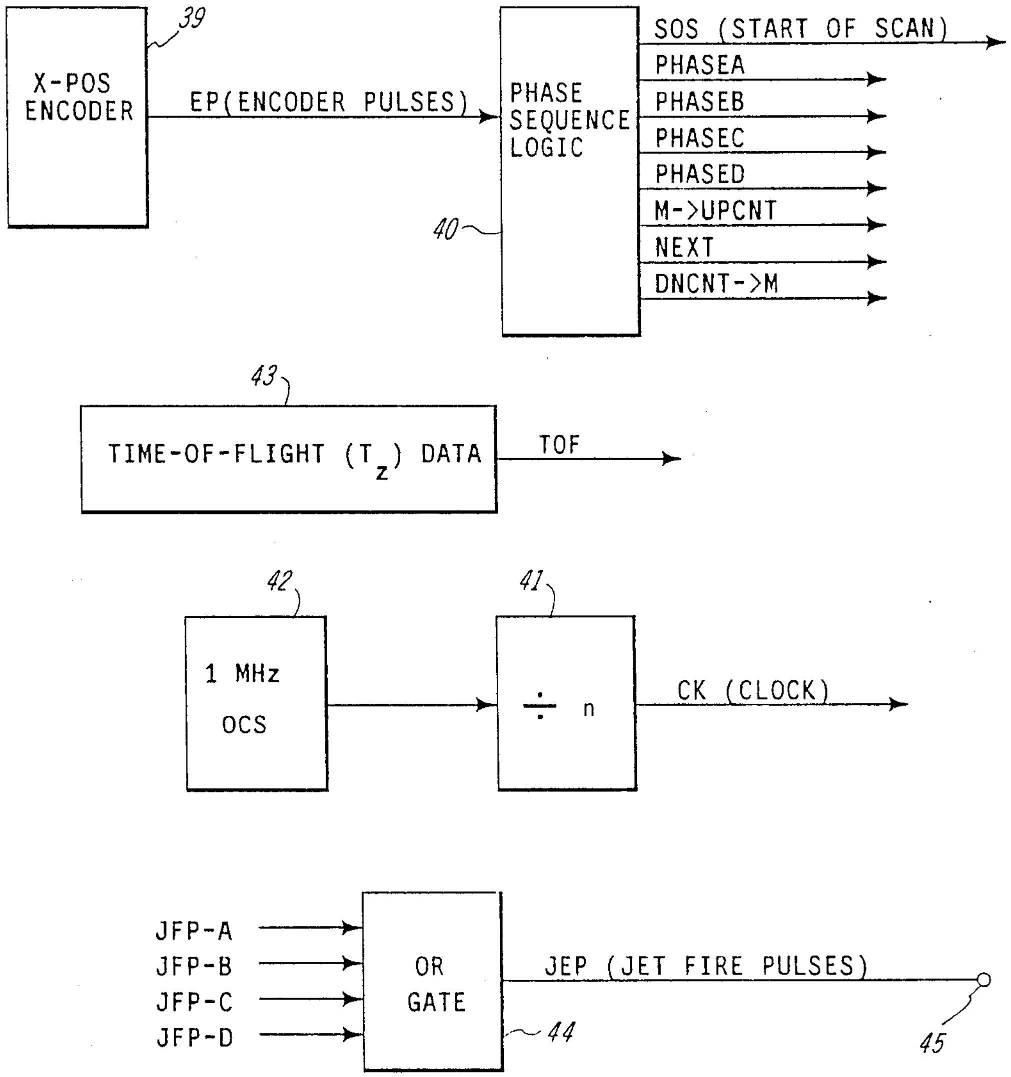
FIG. 8 (8*a* and 8*b:* corresponding split schematic), is a simplified functional diagram of electronic circuitry according to the invention for calculating corrected jet-fire timing for oscillating-carriage ink jet printing apparatus.
Figure 8B:
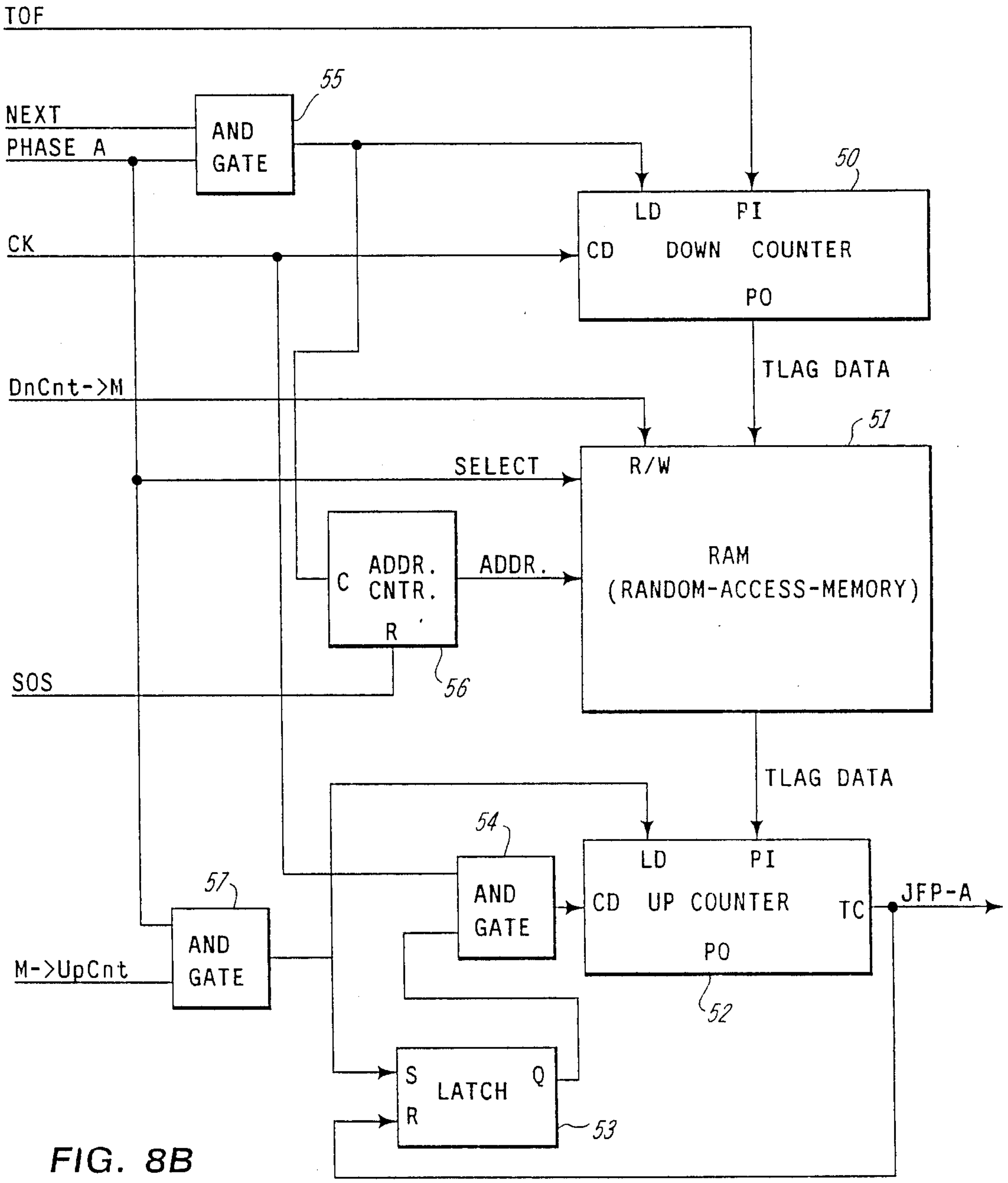
Figure 9A:
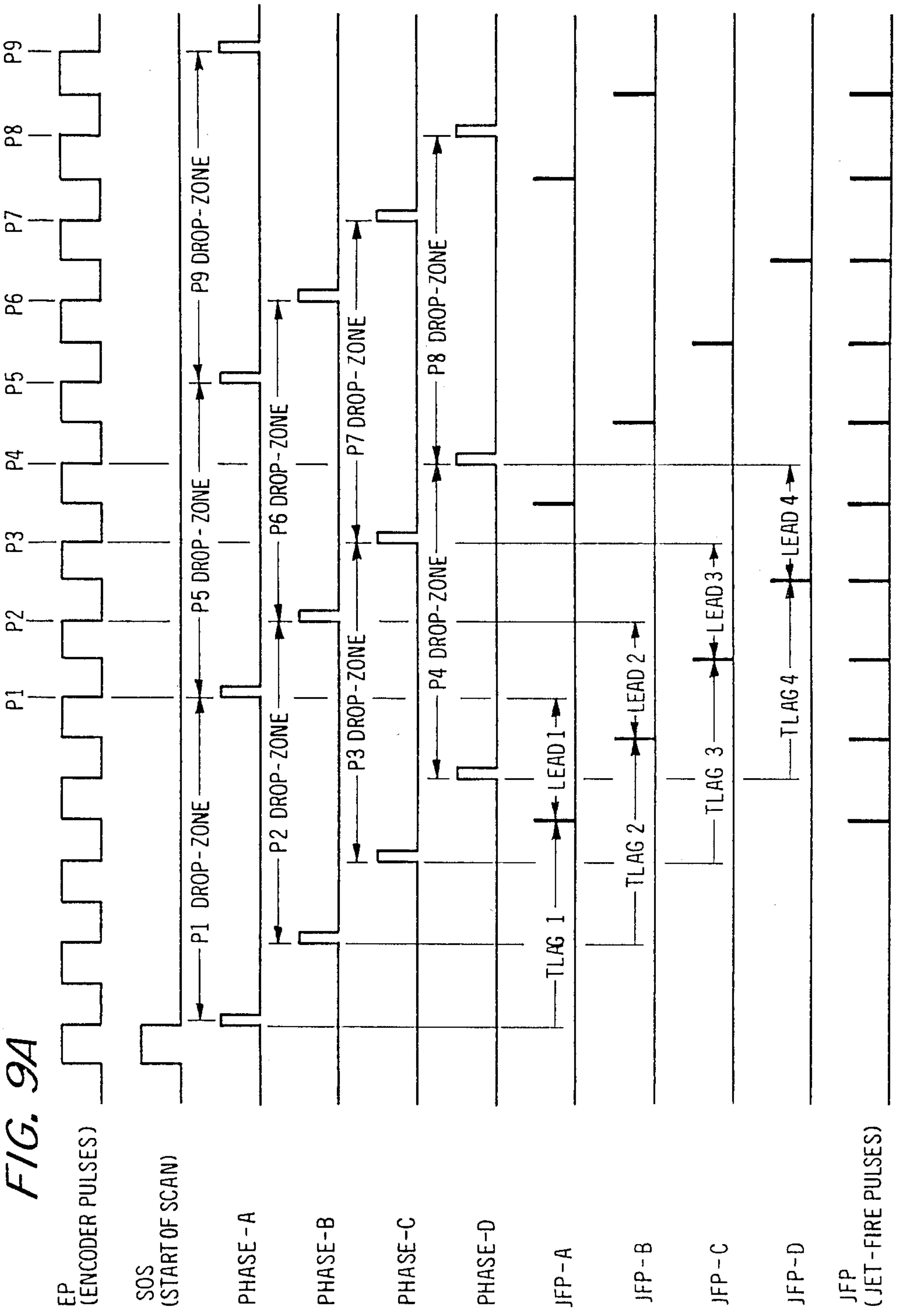
FIG. 9 (9*a* and 9*b:* pulse sequencing diagrams) is a timing diagram for FIG. 8.

FIG. 8 is a functional diagram for a 4-phase counting circuit. The circuit comprises a common section, FIG. 8*a*, and four counting circuit channels, Phase-A, Phase-B, Phase-C, and Phase-D, one of which (Phase-A) is shown in FIG. 8*b*. FIG. 9 is a timing diagram for the circuit of FIG. 8.

In FIG. 8*a*, the carriage X-position encoder 39 generates a train of pulses as the carriage moves, each encoder pulse EP corresponds to the crossing of an x-axis pixel address. From the encoder pulses, timing signals that control the four counting circuits are generated by the phase sequence logic 40. A clock signal CK is shown derived from a 1 MHz oscillator 42 and a divide by n circuit 41. The CK clock is the time-base for the four counting channels; its frequency determines the resolution of the $T_{lag}$ calculations; e.g., a 200 kHz CK clock would provide a count resolution of 5 microseconds. Drop Time-of-Flight ($T_z$) data, with the same time-base as CK, is provided by a sourcce 43; e.g., a known value set into a digital switch, or time-of-flight data from a drop sensor system. The jet-fire pulses, JFP-A, JFP-B, JFP-C, JFP-D, from the four calculating channels, are merged by the OR gate 44 to produce the final jet-fire pulse signal JFP at circuit output terminal 45.

In FIG. 8*b*, one (Phase-A) of the four calculating channels is shown. Each of the four channels operate identically except for the timing of the Phase-A,B,C,D pulses as shown by the timing diagram FIG. 9*a*. The counting cycle of each channel is initialized by its respective Phase pulse, the period between pulses being a drop-zone period. The $T_{lag}$ data is generated by a down-counter 50. The function $T_{lag}=P-T_z$ is performed by initializing the counter 50 with a positive TOF($T_z$) value at the beginning of each counting phase. As the counter is decremented by CK for the period P, the remaining count will be a negative value for $T_{lag}$ since P will always be greater than $T_z$. The $-T_{lag}$ value is stored in its respective memory location in RAM 51. During the next cycle of the carriage, at the beginning of the same drop-zone period, the $-T_{lag}$ value is accessed from RAM 51 and loaded into Up-Counter 52 which starts incrementing by CK toward zero where its terminal-count (TC) pulse generates the jet-fire pulse JFP-A,B,C,D. The down-counter 52 is stopped at zero by resetting latch 53 with TC to inhibit CK via AND gate 54. Each channel is initialized at the beginning of each carriage cycle by the common SOS (start-of-scan) signal from the phase logic 40 in FIG. 8*a*. The SOS signal resets the memory address counters to zero so that memory addressing always corresponds directly to absolute carriage position.

Figure 9B:
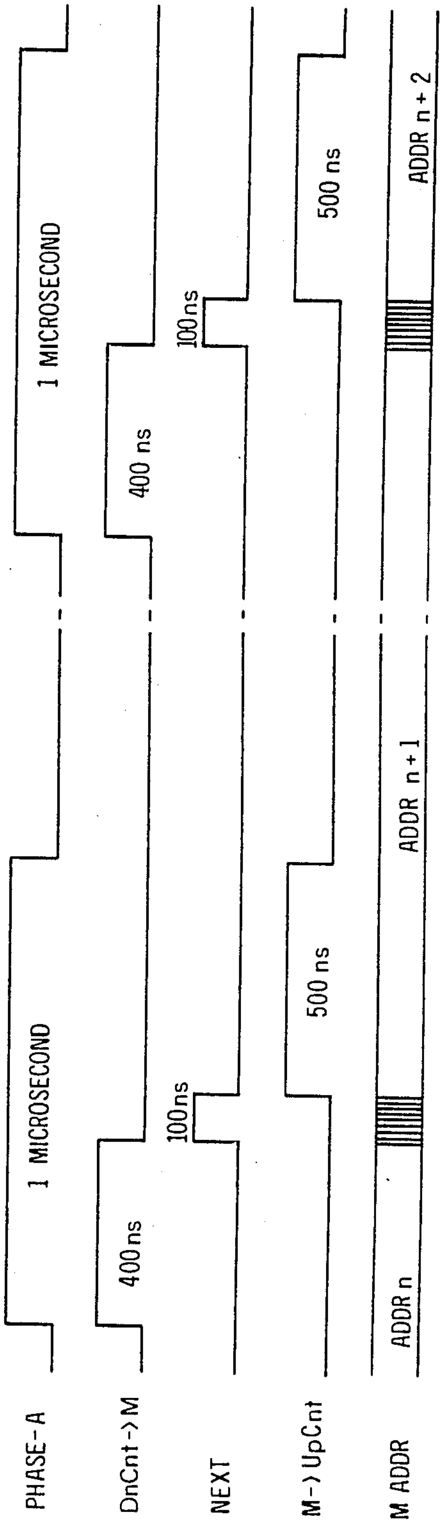

FIG. 9*b* shows that during each one microsecond Phase pulse, three sequential timing signals are generated to control the counters and memory. The first signal "DnCnt->M" actually represents the last 400 nanoseconds of the previous counting period at which time the calculated $-T_{lag}$ value is to be stored into the current memory location. In FIG. 8*b*, it enables "writing" into RAM 51 via the R/W control. The 100 nanosecond "Next" signal is actually the transition between measuring periods. In FIG. 9*b*, it is ANDed with the "Phase-A" signal, via AND gate 55, to initialize the down-counter 50 with the TOF data and to advance the memory address counter 56 to the next memory address. The "M->UpCnt" signal is the first 500 nanoseconds of the next counting period. In FIG. 8*b*, it is ANDed with the "Phase-A" signal, via AND gate 57 to load the up-counter 52 with the $-T_{lag}$ data and to set latch 53 to enable CK clocks so that counting starts.

While the invention has been described with reference to specific embodiments, it will be understood by those skilled in the art that various changes will be made and equivalents may be substituted for elements thereof without departing from the true spirit and scope of the invention. In addition, many modifications may be made without departing from the essential teachings of the invention.

We claim:

1. An ink jet printer timing circuit comprising:

counting means for determining a first number of clock pulses, each representing a unit of time, that occur between the beginning and end of the time required for the ink jet to travel each unit distance in relation to the position of the paper, means for subtracting from said first number of clock pulses a second number of clock pulses representing the time required for an ink drop to travel from jet to paper, to produce a third number of clock pulses representing the delay required between the time that the ink jet is positioned at the start of said unit distance and the time that an ink drop should be ejected so that said ink drop will impact said paper at the time that said ink jet is at the end of said unit distance, memory means for storing said third number, and a timing means to convert said third number of clock pulses into a time delay, at the end of which an ink drop will be ejected, said delay being started at the time the ink jet is positioned at the start of said unit distance on the next print cycle.

2. The circuit of claim 1 wherein:

said counting means comprises a first counter, said means for subtracting comprises a means for setting said first counter to a value corresponding to said ink drop travel time prior to the start of counting, and said timing means comprises a second counter for counting down said third number of clock pulses.

3. The circuit of claim 2 wherein said counting means further comprises:

an encoder pulse counter for numbering all unit distances traveled during a complete cycle of ink jet motion, said memory being addressed by said encoder pulse counter for storing said third number of clock pulses associated with each unit of distance, and means for coupling to said timing means said third number of clock pulses for the associated unit distance of the previous cycle, and for then storing the current number for use during the next cycle.

4. The method of controlling the timing of an ink jet printer comprising the steps of:

during a first cycle of ink jet carriage travel, determining the time required for said ink jet to travel a particular unit distance, subtracting from the result of said determining step the flight time required for an ink drop to travel from ink jet to paper, during a second cycle of ink jet carriage travel, using the result of the subtracting step to delay the ejection of an ink drop past the moment that the ink jet is adjacent the start of the same unit distance so that the ink drop will impact the paper at the moment the ink jet is adjacent the end of said same unit distance, and performing said determining and subtracting steps again for the same unit distance, for use during the next cycle of carriage travel.

5. The method of claim 4 wherein a plurality of channels are performing said steps concurrently and successively so that a plurality of ink drops may be in flight at the same moment.

6. An ink jet printer timing circuit comprising:

a clock pulse generator, first and second counters, means for setting said first counter to a number of clock pulses corresponding to the flight time of an ink drop, means for counting down said first counter by the number of clock pulses occurring during the time it takes for the print head to travel a specific unit distance on the previous cycle to produce a timing number which is the difference between the flight time and the travel time, means for storing said timing number, means for initializing said second counter to said timing number at the time when said print head reaches the start of said specific unit distance on the current cycle, said second counter being responsive to said clock pulses to count down to zero, at which time the ink drop will be ejected.

7. The circuit of claim 6, wherein a linear encoder mechanically coupled to said print head generates start and finish pulses at the beginning and end of said specific unit distance, between which clock pulses are counted by said first counter.

8. An ink jet printer timing circuit comprising:

means for determining a timing number which is equal to the difference between the time required for the print head to traverse a unit distance and the flight time of an ink drop from jet to paper, a memory for storing each number for each drop zone, means responsive to said number stored on the last print head bar cycle for determining, for the current cycle, the point at which the ink drop should be ejected so that, after correcting for print head velocity, the drop impacts the paper at the correct point.

9. The circuit of claim 6 wherein said sensor determines the velocity in both directions, and wherein there is a memory storage location for each drop zone for each direction.

10. The method of controlling the timing of an ink jet printer comprising the steps of:

determining the time required for said ink jet to travel a unit distance during the previous cycle, subtracting that time from the time required for an ink drop to travel from jet to paper, to form a timing period, using the timing period to delay the ejection of an ink drop from the moment that the ink jet is adjacent the start of the same unit distance on the next cycle so that the ink drop will impact the paper at the moment the ink jet is adjacent the end of said unit distance.

11. The method of claim 10 wherein a plurality of channels are performing said step concurrently and successively so that a plurality of ink drops may be in flight at the same moment.

* * * * *